Sept. 15, 1925                                             1,554,044
                        C. C. SMITH
                  TIRE INFLATING APPARATUS
                    Filed March 23, 1923
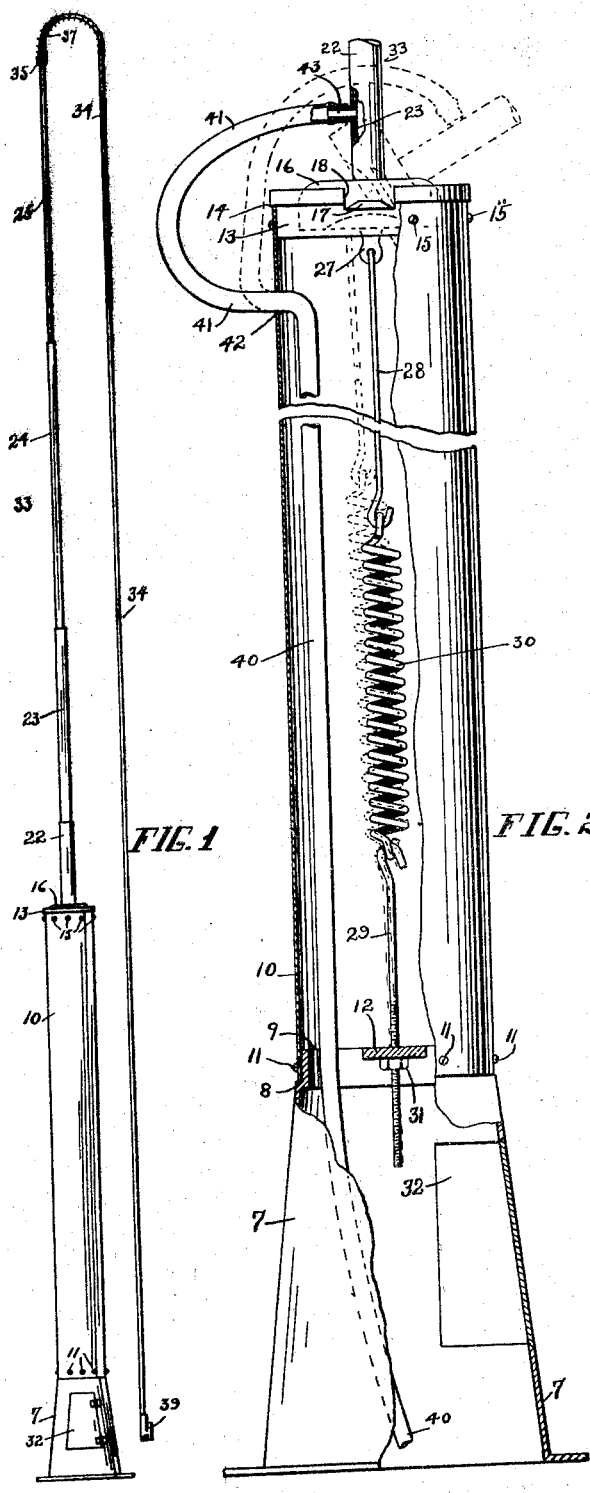
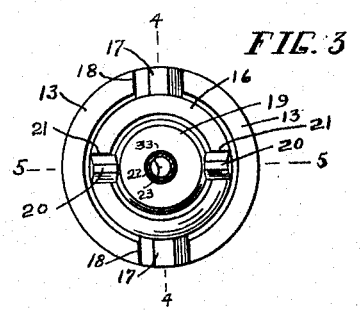
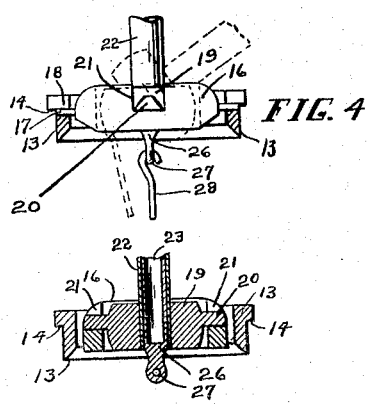
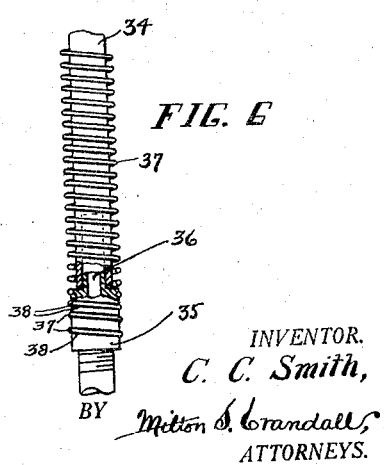
INVENTOR.
C. C. Smith,
BY Milton S. Crandall,
ATTORNEYS.

Patented Sept. 15, 1925.

1,554,044

UNITED STATES PATENT OFFICE.

CLIFTON C. SMITH, OF LAKE ANDES, SOUTH DAKOTA.

TIRE-INFLATING APPARATUS.

Application filed March 23, 1923. Serial No. 627,054.

*To all whom it may concern:*

Be it known that I, CLIFTON C. SMITH, a citizen of the United States, and a resident of Lake Andes, in the county of Charles Mix and State of South Dakota, have invented certain new and useful Improvements in Tire-Inflating Apparatus, of which the following is a specification.

My present invention aims to provide an improved tire inflating device of that type having a universally swinging standard carrying a tire inflation tube.

The invention has for a further object the production of a device of this character having a swinging standard of minimum length so mounted and adapted that it may be extended laterally a maximum distance.

Furthermore, the invention provides a tire inflating device including a normally vertical standard adapted to be swung universally to an operative position and so mounted that when released in operative position that it will be gradually retracted to and gently stopped in its normal position.

Still a further object of the invention is the production of a device of this class which is comparatively simple and inexpensive in construction, installation and maintenance, yet durable and thoroughly dependable in operation and occupying but a minimum space.

These and other objects and advantages are successfully attained in the embodiment hereinafter described, defined in the appended claims and illustrated in the accompanying drawings which form a part of this specification and in which like characters of reference indicate corresponding parts throughout the several views, of which,—

Fig. 1 is an elevation of a tire inflating device constructed in accordance with the invention.

Fig. 2 is an enlarged, fragmental elevation of the same.

Fig. 3 is a plan of the same, the tubular standard being shown in section.

Fig. 4 is an elevation of the universal joint mounting and associated parts, the bearing being in section taken on the line 4—4 of Fig. 3.

Fig. 5 is a vertical section of the same taken on the line 5—5 of Fig. 3, and

Fig. 6 is an enlarged elevation of the jointed ends of the standard and flexible tube, parts being cut away and shown in section.

Referring to the illustrations, the device of my invention comprises, essentially, a tubular post, preferably consisting of a cylindrical or conical casting, 7, formed at its upper end with an annular shoulder, 8, and a rim, 9, encircled by a sheet metal cylinder, 10, resting on the shoulder, 8, and secured to the rim, 9, by screws or bolts, 11. Extending diametrically across and formed integrally with the rim, 9, is a cross member, 12. The upper end of the post is clad with an internal collar, 13, having an external annular shoulder, 14, resting on the upper end of the cylinder, 10, the latter being secured to the said collar, 13, by screws or bolts, 15, or otherwise. The said collar, 13, serves to rigidify the upper end of the cylinder, 10, and afford a bearing for the universal joint comprising an outer ring, 16, provided with flat diametrically opposite and horizontally disposed projections, 17, resting in notches, 18, in the collar or bearing, 13. The second universal joint element consists of a block, 19, encircled by the ring, 16, and provided with diametrically opposite flat projections, 20, disposed horizontally and at right angles to the flat projections, 17, of the companion member and resting in notches, 21, in the ring, 16.

To the joint element, 19, is rigidly secured the swinging tubular standard, preferably comprising one comparatively short length of pipe, 22, extending coaxially through and welded or otherwise suitably secured to the joint member, 19, and enclosing a relatively longer section of pipe, 23, terminating in successively reduced pipe sections, 24 and 25, respectively. The lower end of the pipe, 23, is provided with a suitable head, 26, having an eye, 27, projecting below the block, 19, to which eye is secured means for retracting and yieldably holding the tubular standard to and in its normal or vertical position, in the form chosen for illustration such means consisting of rods, 28 and 29, secured respectively to the eye, 27, and the cross member, 12, in the lower portion of the post, said rods being interconnected by a suitable retracting spring, 30. To accurately regulate the tension of the spring, 30, the rod, 29, is threaded, extended freely through the cross member, 12, and provided with a nut, 31, engaged with the under side of the cross member, 12, whereby it is clear the spring may be tightened or loosened by accordingly screwing or unscrewing the nut, 31, the post, 7, being provided with a door, 32, to afford convenient access to the said nut. To the upper end of the standard, represented generally at 33, is suitably secured a hose or flexible tire inflating tube, 34, preferably by means of a cap, 35, threaded onto the end of the standard and provided with an axial nipple, 36, extended into the hose, 34. To prevent kinking or abrupt bending of the hose at the end of the standard the connected end portion of the hose is encircled by the coiled spring, 37, threaded into grooves, 38, in the cap, 35, whereby the spring is secured to the standard and permits the hose to normally depend from the standard as in Fig. 1. The free end of the hose is provided with the usual valved socket, 39, or any preferred element for connecting the hose with a tire valve tube.

The lower end portion of the standard is connected in any suitable manner with a source of air pressure. As illustrated I enclose within the post the pipe or tube, 40, adapted to be connected at its lower end with a source of compressed air (not shown) its upper end portion, 41, being flexible and extended through an opening, 42, in the side of the cylinder, 10, and connected with a lateral nipple, 43, in the lower end portion of the standard, the end portion, 41, of the tube being sufficiently slack to permit free movement of the standard.

It will now be clear that the standard is normally vertically disposed, has no parts overhanging the post and by virtue of its universally jointed support it may be swung in any direction. When the standard is swung at right angles to the joint projections, 17, the parts will assume the position indicated in dotted lines in Fig. 2, the edges of the projections, 17, resting upon the collar, 13; and when the standard is swung at right angles to the projections, 20, of the inner joint member the parts will assume the position indicated in dotted lines in Fig. 4, the edges of the projections, 20, resting on the ring, 16. Obviously, when the standard is swung at any angle intermediate those just described both joint members, 16 and 19, will be rocked on their respective supporting projections. It is also evident that the standard is swung laterally to operative positions by the operator's pulling on the hose, 34, and that when the standard is released in such operative positions it is retracted to and held yieldably in its normal vertical position by virtue of the action of the spring, 30, on the universally jointed support, and as the retracting power is applied quite close to the plane of the fulcrums, 17 and 20, very little power is required to swing the standard, and when it is released it is quite slowly retracted, gently stopping in its normal vertical position with its flat joint pivots, 17 and 20, resting on their respective bearings.

Although I have illustrated and above described but one form of the invention, I would not be understood as being limited to such specific construction, for various alterations and modifications may be made in the details of construction and arrangement of parts herein disclosed without departing from the spirit and scope of the invention as defined by the following claims, to-wit:

1. In a device of the class described, a hollow post having opposite slots in its upper end, a ring having opposite projections received in said slots, provided with flat under surfaces, said ring having opposite slots in its upper surface arranged at ninety degrees from the projections on said ring, a standard projecting above said post, having at its lower end opposite projections received in the slots in the ring and provided with flat under surfaces and a spring connected with the lower end of said standard and with said post for normally holding the standard upright.

2. In a device of the class described, a hollow post having opposed slots in its upper end, a ring having oppositely extending projections received in said slots, provided with flat under surfaces, said ring having opposite slots in its upper surface arranged at ninety degrees from the projections on said ring, a standard projecting above said post having at its lower end oppositely extending projections received in the slots in the ring and provided with flat under surfaces, a spring connected with the lower end of said standard, a cross piece in the lower end of said post, a threaded rod secured to the lower end of the said spring and extended through an opening in the cross piece, and an adjusting nut threaded on said threaded nut and coacting with said cross piece to adjust the tension of the spring.

3. In a device of the class described a post, a ring having opposite arms supported on the upper end of said post for rocking motion, a standard projecting upwardly from the post having at its lower end opposite arms supported on said ring for rocking motion and arranged at substantially ninety degrees from said first arms, said standard having a portion projecting downwardly into the post below all of said arms, and a tension spring connected with said portion and with said post for exerting yielding pressure on the standard for normally holding it upright.

In testimony whereof, I have hereunto set my hand this 14th day of March, 1923.

CLIFTON C. SMITH.